April 20, 1965 L. P. DEACKOFF 3,179,385
METHOD AND APPARATUS FOR PROCESSING FLUIDS
Filed Nov. 17, 1961 8 Sheets-Sheet 1

Inventor:
Leon P. Deackoff,
by
Attorney

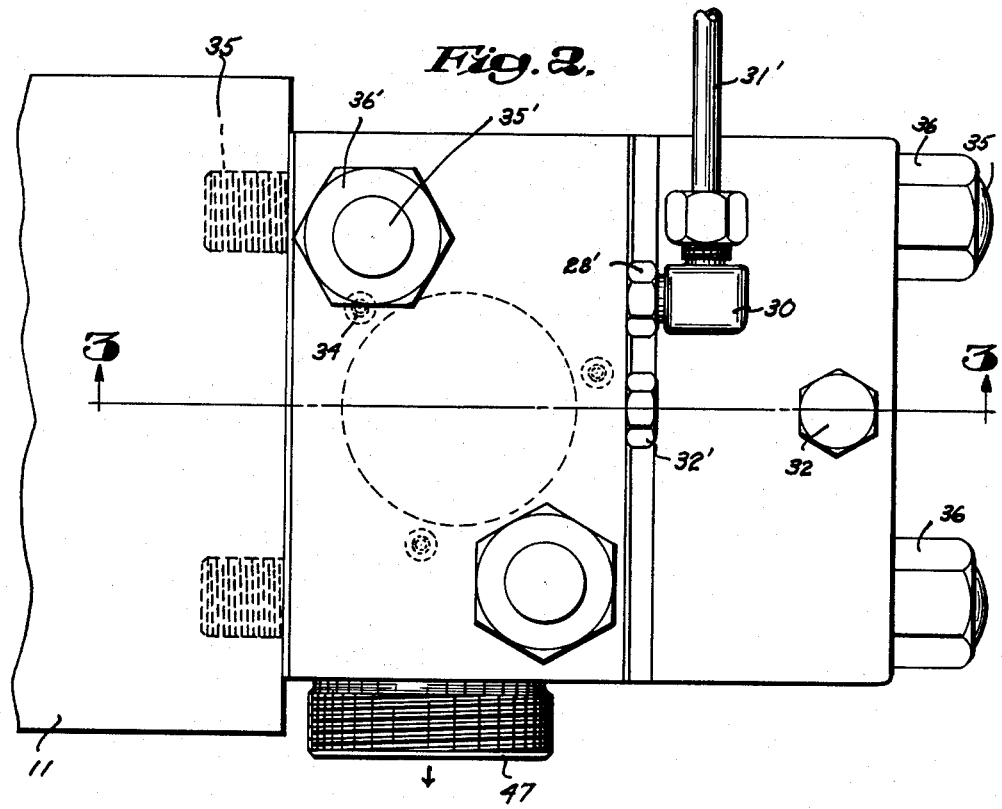
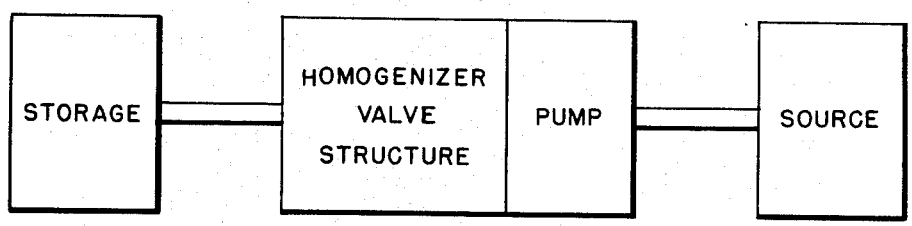

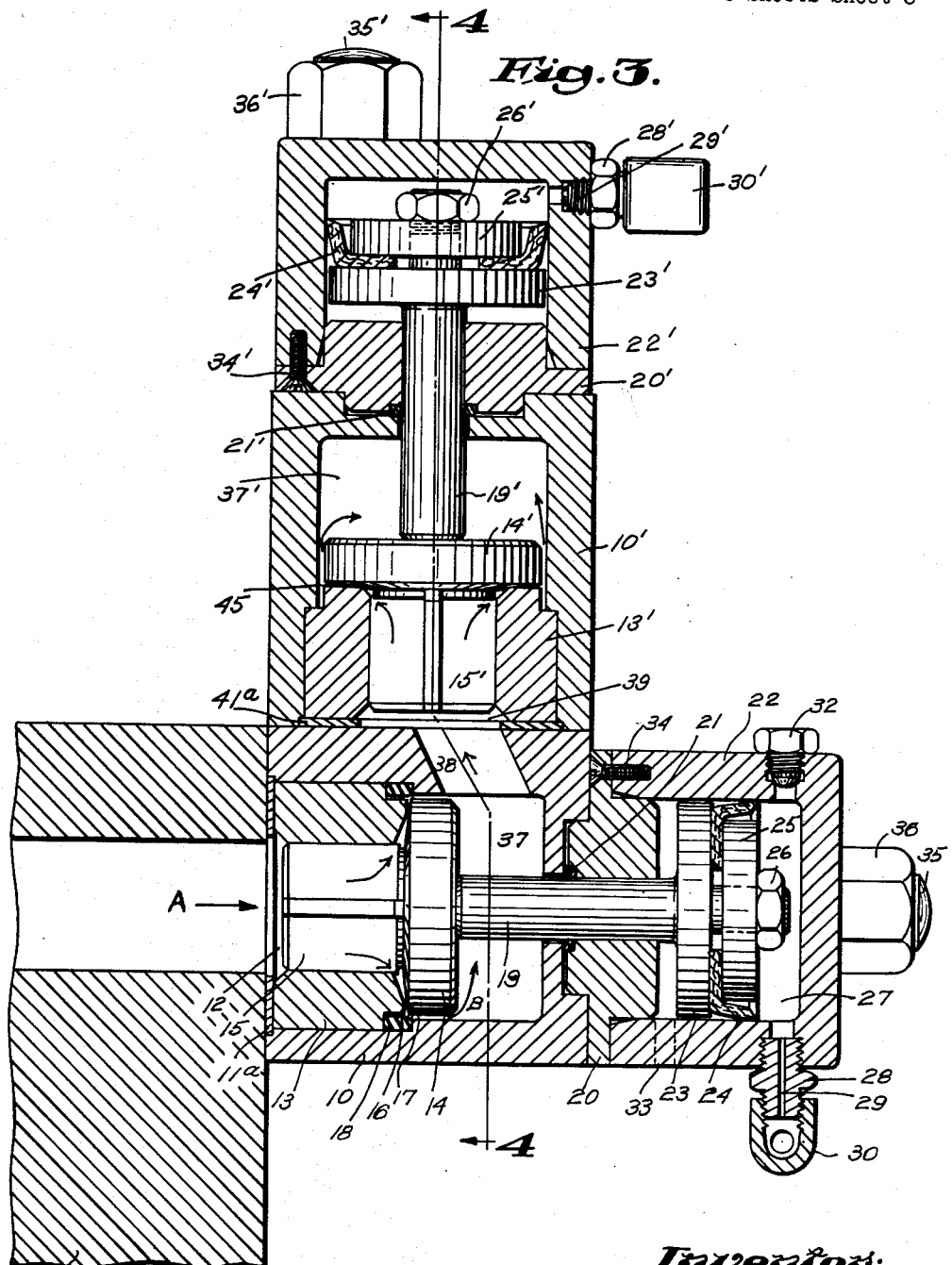

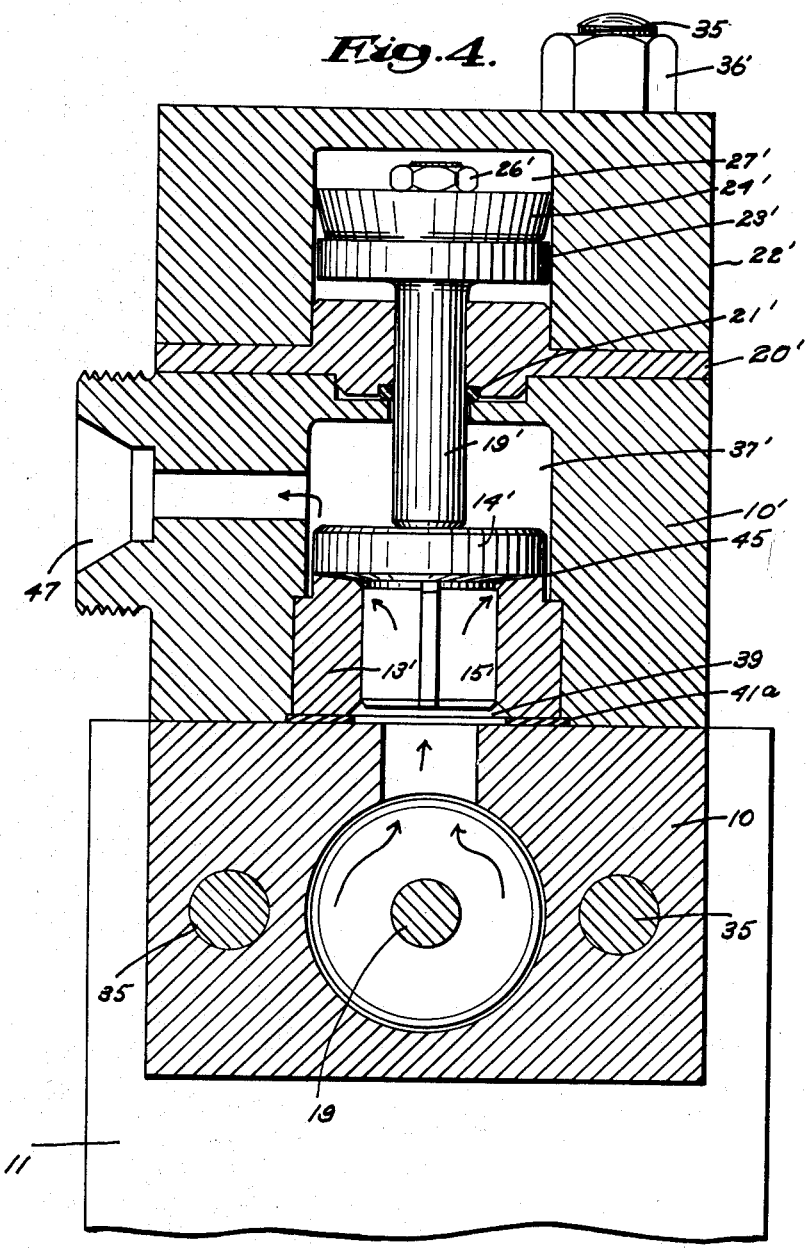

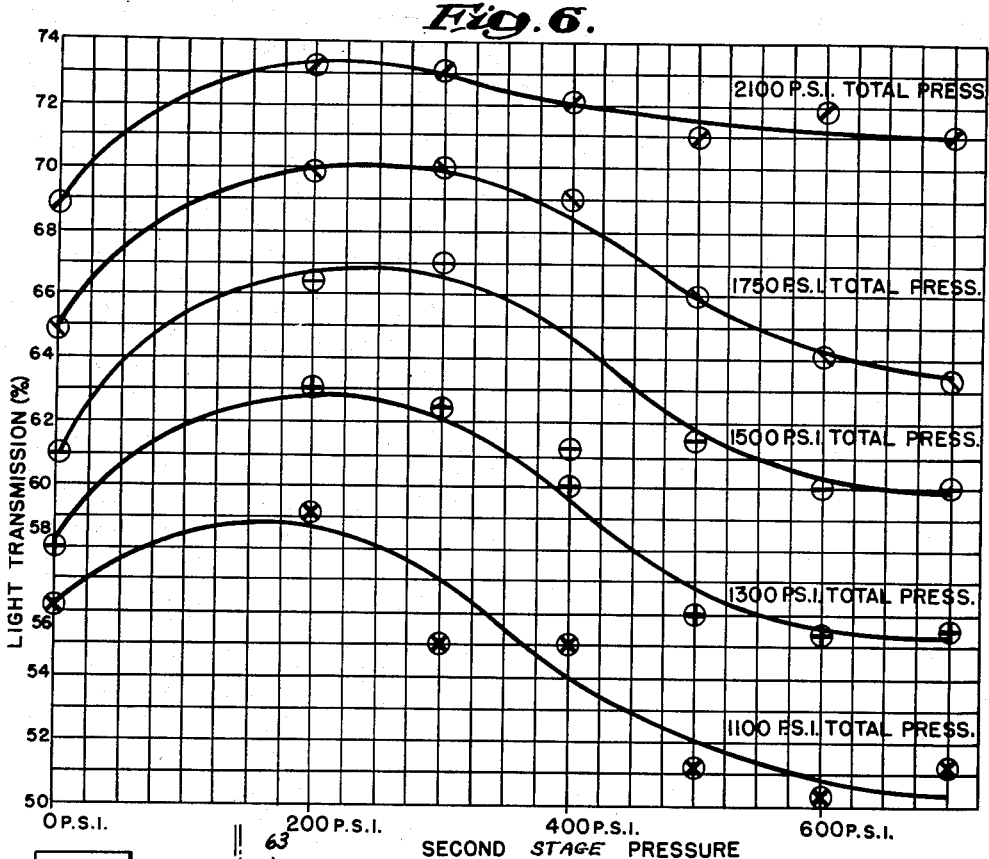
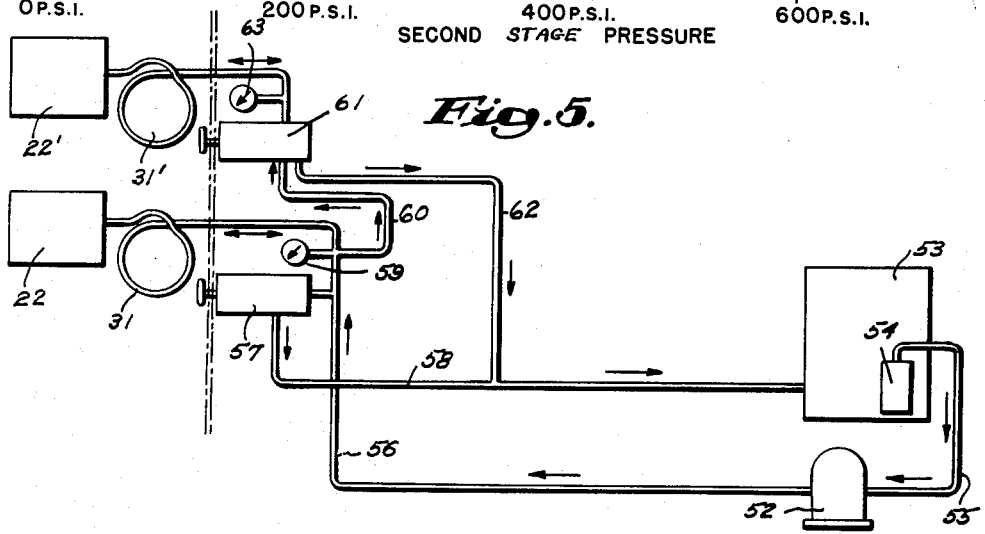

Inventor:
Leon P. Deackoff,
by Mason T. Hamilton Attorney

April 20, 1965 L. P. DEACKOFF 3,179,385
METHOD AND APPARATUS FOR PROCESSING FLUIDS
Filed Nov. 17, 1961 8 Sheets-Sheet 8
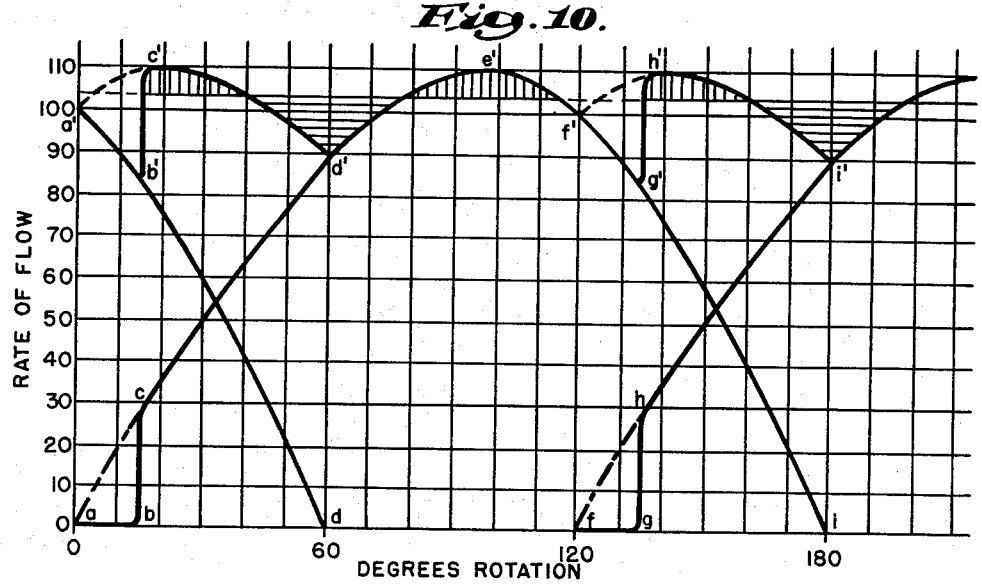
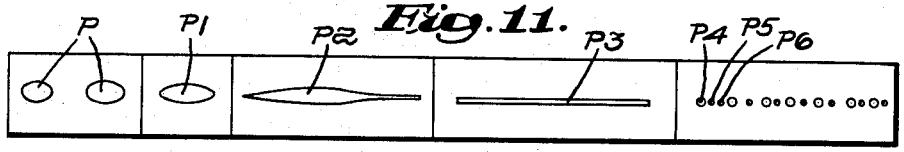
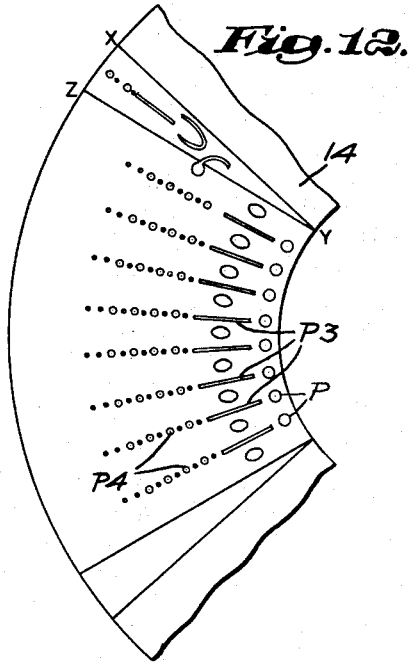
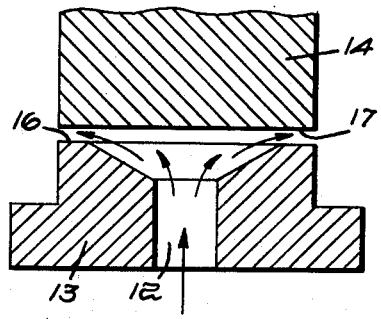
Inventor:
Leon P. Deackoff,
by James D. Hamilton
Attorney

United States Patent Office 3,179,385
Patented Apr. 20, 1965

3,179,385
METHOD AND APPARATUS FOR PROCESSING FLUIDS
Leon P. Deackoff, Gloucester, Mass., assignor to Manton Gaulin Manufacturing Company, Inc., Everett, Mass., a corporation of Massachusetts
Filed Nov. 17, 1961, Ser. No. 153,052
7 Claims. (Cl. 259—98)

This invention relates to processing liquid bodies by subjecting such bodies to relatively high pressures. More particularly the invention is concerned with a method and apparatus for processing liquid bodies which contain particles or droplets capable of being reduced and separated into relatively smaller component parts. In one specific aspect the invention is concerned with high pressure treatment of the fatty particles commonly occurring in milk in order to break down and separate such particles into a very fine state of subdivision, a technique which is commonly referred to as homogenization. It is well known to those skilled in the art of homogenization that the fatty particles are attenuated and drawn out into finely disposed ligaments or filaments which thereafter tend to become separated into tiny droplets to a greater or lesser degree depending upon the efficiency of the processing operation.

In the conventional type of homogenizing apparatus commonly used in processing milk, it is customary to employ a control knob, wheel or handle and a spring of some suitable type for biasing the valve member in order to maintain uniform pressure at a narrow orifice comprised by the valve and adjacent parts of the homogenizing apparatus. It is a common assumption in the art that unless a substantially uniform pressure is maintained across the orifice undesirable effects will be experienced and the quality of a homogenized product tends to become less satisfactory. In practice, however, the maintenance of uniform pressure values is difficult and within such limits as uniformity is realized still other problems arise. For example, manual adjustment of spring-loaded valves may become a problem and the maximum thrust which may be realized is of undesirably limited nature. Under certain circumstances the homogenizing valve may start to oscillate independently of other parts of the apparatus and fatty particles of the milk may be insufficiently attenuated and subdivided by passing through the oscillating valve with the result that adequate homogenization fails to take place. Such conditions may result in excessively high operating costs as well as causing excessive wear of the homogenizing equipment.

It is an object of the present invention to provide improved methods and apparatus for processing liquid bodies by subjecting them to relatively high pressures, reference being had especially to the processing of milk on a commercially significant scale. With the problems outlined above in mind, I have conceived of a method of high pressure treatment of fluids and particularly fluids containing fatty particles such as are present in milk, wherein processing pressures rather than being held uniform are caused to vary abruptly.

In accordance with the invention I provide a novel hydraulic valve actuating mechanism, together with two valve surfaces which may be held in absolute fixed relationship to one another by this valve actuating mechanism. Fluid material is passed between these fixed surfaces with the product velocity being caused to vary periodically in a pattern controlled by the rate of discharge of a pumping mechanism whose output fluctuates in a known manner. The hydraulic valve actuating mechanism and the pumping means are in the invention method made to cooperate with one another in a unique manner to produce attenuation and subdivision of fatty milk particles to a degree not heretofore realized.

An important feature of the invention is a method and apparatus for maintaining the valve surfaces in fixed relationship by hydraulically actuating the supporting structure for one of the surfaces in a rigid manner so as to contain high pressure pulsations. In thus containing relatively high pressure pulsations between these fixed surfaces, within limits approaching but not exceeding the strength characteristics of the retaining structure, unusual conditions are set up and I find I am enabled to generate high velocity shock wave forces which can be controlled and applied to provide suddenly occurring particle disruptive effects of a highly unusual nature.

The nature of the invention and its other objects and novel features will be more fully understood and appreciated from the following description of the invention, a preferred form of which is illustrated in the accompanying drawings, in which:

FIGURE 2 is a plan view illustrating further details of the structure illustrated in FIGURE 1;

FIGURE 3 is a vertical cross section taken approximately on the line 3—3 of FIGURE 2;

FIGURE 4 is a cross sectional view taken on the line 4—4 of FIGURE 3;

FIGURE 5 is a diagrammatic view illustrating hydraulic valve actuating means of the invention, together with special valve regulating devices and pumping means;

FIGURE 6 is a graph illustrating curves which indicate performance characteristics of a homogenizing method and apparatus operated in accordance with the invention;

FIGURE 10 is a diagrammatic view illustrating curves showing the performance characteristics of a pumping mechanism of the invention;

FIGURE 11 is a diagrammatic view illustrating stages in progressively reducing a butter fat particle into an extended state of subdivision;

FIGURE 12 is a fragmentary plan view of homogenizing aperture further illustrating diagrammatically deformation of butter fat particles when moved at relatively high velocities;

FIGURE 13 is an enlarged fragmentary cross sectional view of a homogenizing valve means with the homogenizing aperture shown on a somewhat larger scale to indicate the path of travel of particles; and FIGURE 14 is a diagrammatic view illustrating pump and homogenizing valve in operative relationship to one another.

Figure 1:
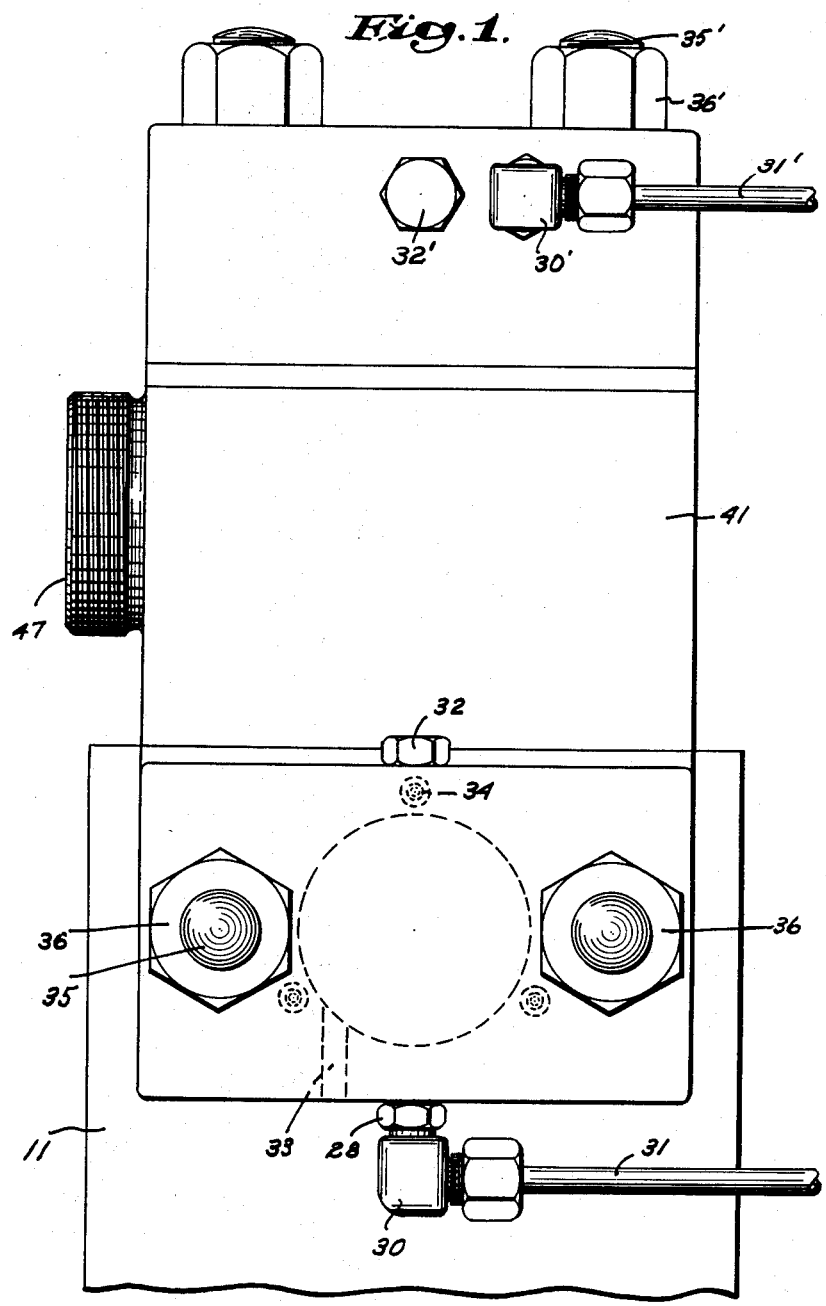
FIGURE 1 is a front elevational view illustrating a novel hydraulic valve actuating mechanism employed in carrying out the method of the invention with a pump member fragmentarily shown at one side thereof.

The method of the invention in its broadest aspect is based on the idea of exerting particle disruptive forces which proceed from first generating extremely high velocities in a fluid at a point of initial acceleration through an orifice and then superimposing on this pressurized system high velocity shock wave forces of nearly explosive characteristics. When such shock wave forces are contained within limits which approach but do not exceed the strength characteristics of the retaining surfaces, it becomes possible to realize an improved attenuation and disintegration of milk particles to a very significant extent.

In carrying out a preferred form of my invention, I provide a source of supply of milk; a pumping mechanism for pumping the milk under high pressure; an annular orifice valve structure; and a novel hydraulic valve actuating mechanism. These parts are indicated diagrammatically in FIGURE 14. The orifice valve structure and novel hydraulic valve actuating mechanism, together with a part of the pumping means are shown in detail in one preferred form in FIGURES 1 to 4 inclusive and include a two-stage valve assembly with the novel hydraulic valve actuating means of the invention combined therewith at both the first and second stages. FIGURE 5 illustrates the hydraulic system for operating the hydraulically actuated valve mechanism.

Referring more in detail to FIGURES 3 and 4, numeral 10 denotes a valve body for a first-stage valve assembly. The valve body 10 is supported in sealed relation by gaskets 11a on a high pressure pump 11. The member 11 may, for example, consist of a three-plunger positive displacement type pump commonly referred to as a Triplex pump. This pumping means has an output flow rate of the type represented in FIGURE 10 and functions to pump a product such as milk to the structure shown in FIGURES 1 to 4 inclusive.

Considering more in detail the performance characteristics of the product pumping apparatus, attention is directed to FIGURE 10. The theoretical displacement of product by a single plunger of a Triplex pump, that is the rate of discharge induced by the single plunger, is depicted in FIGURE 10 by a curve $a, c, d', e', f', g', i$. Since there are three plungers that operate in a similar fashion, although displaced by 120° from one another, there is realized a theoretical rate of discharge of the pump as a whole as depicted by the rate of discharge curve $a', c', d', e', f', h', i'$. It will be understood that this operating curve is repeated in a uniform manner to provide the maximum output of the pump.

However, in commercial homogenizers of the positive displacement type, there occurs in connection with such a pump cycle a discontinuity in rate of flow of an important nature. This discontinuity may be due to one or more of several factors, such as imperfect pump valve action, imperfect pump valve maintenance, entrained air or gases in the product to be processed, variation in the composition of the product itself, partial vaporization of the product in the plunger port caused by high temperature and/or low pressure of the product as it enters the homogenizer, and other factors.

Because of any one or a combination of these factors the discontinuity in rate of discharge may, I find, be depicted by a rate of discharge curve such as rate of discharge curve $a, b, c, d', e', f', g', i$ for a single plunger of a product pumping mechanism. When there are three plungers operating in the manner above described, then the rate of discharge of the pump as a whole is depicted by the rate of discharge curve $a', b', c', d', e', f', g', h', i'$.

When a homogenizing valve is operating in the fashion illustrated by curve $a', b', c', d', e', f', g', h', i'$, I have observed that there is instability in a conventional spring-loaded valve which results in imperfect homogenization. The reasons for this are not fully understood by those skilled in the art with the result that many forms of spring-held valves have been proposed and used whose efficiencies are substantially less than that desired to do a satisfactory job. As a result it has been the practice to operate at relatively high homogenizing pressures to produce an adequately homogenized product, hence, the problem is accentuated and the need for correction is a very definite need.

From a recognition of these facts, I have conceived of a method and apparatus for carrying out an improved method of homogenizing wherein I employ a hydraulic valve actuating means to maintain two homogenizing valve surfaces when so desired in absolute fixed relationship to one another. With this arrangement a product entering the valve orifice will undergo an initial acceleration which, as is well-known in the art, produces velocities of a magnitude of, for example, 475 feet per second at an operating pressure of 2,500 p.s.i.

Thereafter, by means of my hydraulic actuating mechanism the two orifice surfaces one of which is hydraulically positioned to resist displacement are thus held in absolute fixed relationship to one another so that secondary accelerations and decelerations are generated varying periodically in a manner controlled in accordance with the rate of discharge of curve $a', b', c', d', e', f', g', h', i'$. Velocity and pressure relationships are established by the formulations $V=Q/A$, where V stands for velocity, Q is quantity of material flowing, and A represents area of aperture at any given point, $V=K\sqrt{2gh}$ where K is a constant, g is the gravitational constant and h represents pressure.

I find that with changes in velocity resulting from secondary accelerations and decelerations, as noted from the above formula, shock wave forces are generated. These shock wave forces are believed to act on the particles while they are still within the fixed surfaces of the homogenizing valve structure and at a point at which the particles have already been attenuated to a very considerable extent.

Considering in greater detail the valve structure of the invention which is employed in combination with the Triplex pump mechanism above described, reference is had to FIGURES 3 and 4. As may be observed from an inspection of these figures, product from the high pressure pump travels in the manner suggested by directional arrow A (FIGURE 3) through a passageway 12 in the first stage valve seat 13 which is of annular form as shown. Numeral 14 denotes a valve which is of conventional construction and which is guided in the valve seat by a guide 15. The valve seat 13 is formed with a smooth homogenizing surface 16 which is arranged to lie in spaced parallel relation to a second homogenizing surface 17 of member 14. These parts are shown on a larger scale in FIGURE 13. There is also supported in the valve body 10 an impact ring 18 of well-known nature.

The valve 14 is, in accordance with the method of the invention, held in the valve body 10 in fixed relationship with respect to the valve seat 13 by means of a special hydraulic valve actuating mechanism. The hydraulic valve actuating means includes a valve thrust rod 19 guided in a guide plate 20 and sealed in sealing ring means 21. I also provide a housing 22, in which is slidably supported a piston 23 integral with the thrust rod 19. A sealing means 24 is supported in clamped relationship to the piston 23, as shown in FIGURE 3, by means of a washer 25 and holding nut 26.

It will be observed that the piston 23 is arranged in spaced relationship to one end of the housing 22 to form a chamber 27. This chamber is provided to constitute a reservoir for holding a hydraulic fluid which may be introduced through a tubular fitting 28, having an opening 29 formed therein. Another fitting 30 is connected as shown in FIGURE 1, and includes a conduit 31 communicating with a hydraulic fluid pumping system which is illustrated diagrammatically in FIGURE 5. A vent plug 32 is located through the housing 22, as shown in FIGURE 3, and functions to relieve entrapped air so as to insure complete filling of the chamber 27 with hydraulic fluid. A drain hole 33 (FIGURE 1) serves to indicate any leakage of material out of the system, either in the form of hydraulic fluid, or product which is processed in the hydraulic valve actuating mechanism.

Screws 34 secure the guide 20 to the housing 22 in the manner illustrated in FIGURE 3 and these two components are secured as a unit to the high pressure pump 11 by threaded members as 35 and nuts as 36, which are more clearly shown in FIGURE 1.

When pressure is exerted on the hydraulic fluid in the chamber 27 it operates to force the piston 23 and thrust rod 19 against the homogenizing valve 14 so as to maintain this homogenizing valve in a fixed position as hereinafter described in detail. The small opening denoted by numeral 29, in the fitting 28, is designed to function as an impulse arrestor and to act in conjunction with the piston 23 and thrust rod 19 to continuously maintain the valve 14 in a fixed spaced relationship to the valve seat 13.

Product is introduced from pump 11 to the first stage homogenizing valve assembly at inlet opening 12. The product then passes by the guide 15 of valve 13 through the aperture between the valve seat 13 and the valve 14. As noted above this aperture has been shown in FIGURE 13 and is defined by boundary surfaces 16 and 17. Product leaving this homogenizing valve aperture then passes in the direction of arrow B (FIGURE 3) into chamber 37 and thence through a passageway 38 in one side of member 10. The passageway 38 communicates with a space 39, defined by a second stage valve seat 13' supported in a second stage valve body 10', which is mounted on the member 10 and maintained in sealed relation by means of a gasket 41a. A valve guide 15' integral with valve 14' is supported in the valve seat 13', as shown at the upper side of FIGURE 3.

In a manner similar to that described above, the valve 14' is supported by a thrust rod 19' to define an aperture 45 between the valve 14' and valve seat 13'. The product passes through the aperture 45 into chamber 37' and moves out through a discharge outlet 47, as shown in FIGURES 1, 2 and 4. The thrust rod 19' is integral with a piston 23', having a seal means 24' secured as described in connection with the sealing means 24.

A tubular fitting 28', having orifice 29', is connected to a fitting 30', which in turn is connected to a conduit 31' leading to the second stage hydraulic actuator 22'. Screws 34' and 35', together with nuts 36', secure the entire assembly to the first stage valve body 10, as shown in FIGURE 3. A vent plug 32' serves the same purpose already described in connection with the first stage hydraulic actuator mechanism. It will be apparent that this second stage hydraulic valve actuator means of the invention may also function to maintain the aperture defined by valve seat 13' and valve 14' in a fixed position in the manner already described.

In FIGURE 5, I have illustrated diagrammatically a hydraulic pumping system wherein numeral 52 denotes a high pressure hydraulic pump suitable for carrying out the method of the invention. The pump 52 is employed to deliver a hydraulic fluid such as oil from a reservoir 53 through a filter 54 and a conduit 55, and then into conduit 56 to a first stage regulating valve 57 and then through conduit 58 returning to the reservoir 53. The first stage regulating valve 57 is adjusted to maintain a desired hydraulic pressure through conduit 31 to the first stage hydraulic actuator 22. A pressure gauge 59 reads this pressure at the first stage. A small portion of the hydraulic fluid in conduit 56 is carried through the conduit 60 to the second stage regulating valve 61 and returned through conduit 62 to the oil reservoir 53. The second stage regulating valve 61 similarly maintains a desired hydraulic pressure through the conduit 31' to the second stage hydraulic actuator 22' and this pressure is also read on a pressure gauge 63. In a typical pumping operation hydraulic pressures of from 300 to 2,000 p.s.i. are used at the first stage and pressures of from 0 to 300 p.s.i. are used at the second stage.

In operation a pulsating flow of product is initiated by pump 11 through the two-stage valve assemblies in the above-described manner. Then the first stage regulating valve 57, and the second stage regulating valve 61 are adjusted in accordance with the method of the invention so as to provide a hydraulic pressure necessary to maintain each of the two stages of homogenizing valve at predetermintd fixed aperture spacings. For example, in the first stage a hydraulic fluid pressure is directed through conduit 31 and impulse arrestor condut 29 to the chamber 27, developing a hydraulic thrust in the order of several thousand pounds.

An important feature consists in developing a thrust through the thrust rod 19 capable of balancing the displacement forces of the pump 11 exerted on the product to force it through the homogenizing valve aperture. In this connection the impulses arrestor, with its orifice 29, cooperates with the hydraulic fluid body in chamber 27, which is highly incompressible so as to resist any axial movement which would be occasioned by instantaneous impulses arising in the pumping.

As milk or similar product is moved into the homogenizing valve aperture in the first stage, it is subjected by well-known homogenizing principles to pressure of approximately 2,500 p.s.i. Such a pressure value, when converted to kinetic energy, will product an instantaneous velocity of the fluid of approximately 475 feet per second. The abrupt acceleration generates very large forces of deformation which act on the butter fat particles of the milk to extend them into elongated ligaments.

The fatty particles, while thus reacted on by initial forces of acceleration as noted above, are further subjected to secondary forces of acceleration and deceleration generated from the varying flow of the pump. These secondary forces of acceleration and deceleration, operating against the hydraulically held valve orifice, produce shock wave energy. It is known that this shock wave energy is very large with shock waves travelling at velocities as high as 4,700 feet per second which is roughly ten times as great as the velocity or particles moving at the initial acceleration mentioned above. The effect of the shock wave energy is to further disrupt and break down ligaments and droplets which have already been formed with the result that a much greater degree of subdivision and disintegration of the particles can be realized.

As an aid to visualizing this process, I have shown diagrammatically in FIGURES 11, 12 and 13, suggested particle shapes and as will be observed from an inspection of FIGURE 11 especially, particles P pass through several stages. In one stage the particles are elongated as suggested at P1; at another stage they are elongated still further as suggested at P2; and at another stage elongation has proceeded to the point where a ligament P3 is formed. In still another stage the ligament P3 has been disrupted to form much smaller particles as P4, P5 and P6. The shock wave treatment obtained by the secondary acceleration and deceleration of the invention is believed to act on particles which have already been subdivided as represented by the particles P4, P5 and P6, in a manner such that these relatively smaller components are again subjected to elongated ligament formation and still another stage of disintegration.

It will be appreciated that these changes occur within a few thousandths of an inch of travel of the particles after they enter the orifice valve structure. It is also pointed out that the valve orifice is defined by two parallel spaced ring-shaped surfaces. Therefore, the particles necessarily must move through an annular path of travel and as the particles radiate outwardly, they tend to experience other stress conditions.

FIGURE 12 is illustrative of a fluid system having a divergent flow such as is occasioned by a fluid moving through an annular homogenizing aperture as described. In such a system there occurs, at multiple boundaries, a condition where the decreasing velocity in the direction of flow occasioned by the divergent aperture results in increased pressure to a limit where at these multiple boundaries all the kinetic energy is lost, velocity drops to zero, and at which instant a reversal of direction of flow occurs.

These boundaries may be represented, for example, in FIGURE 12, by lines x–y and y–z and are constantly shifting in a random pattern occasioned by additional multiple accelerations and decelerations. This phenomenon is well known to those skilled in the art and is referred to as radial divergence of flow of fluids. This radial divergence also tends to set up additional ligament formation as the particles travel across the aperture, and the shock wave forces of the invention are believed to be especially effective in acting on the ligament formation resulting from radial divergence and in breaking very small ligaments and droplets which have already undergone a process of subdivision.

In radially diverging flows it is also well known in the art that if the pressure at any point is reduced to the vapor pressure of the liquid, the liquid passing this point will begin to vaporize. Such a condition is known as "cavitation" and it has been demonstrated that in a system where cavitation occurs energy losses are experienced with destructive forces of high magnitude being exerted on any solid boundaries present. In order to minimize cavitation, I find that it is sometimes desirable to apply back pressure on the first stage valve aperture and this is conveniently accomplished with the second stage homogenizing valve described above.

Results of applying second stage pressures, i.e., back pressures against the first stage valve aperture are shown in FIGURE 6 where I have shown the result of operating at 1,100 p.s.i., 1,300 p.s.i., 1,500 p.s.i., 1,750 p.s.i. and 2,100 p.s.i. total operating pressure while varying the second stage pressure from 0 p.s.i. up to 700 p.s.i. plotted as the ordinate while the abscissa shows the Light Transmission Percent of the product which results. This means of defining efficiency of homogenization is described in a publication entitled "The Milk Dealer," issue of July 1957 by L. P. Deackoff and L. H. Rees, the light transmission factor increases with increasing homogenizing efficiency and thus constitutes an excellent means of measuring the extent of subdivision realized for any given application of energy.

Figure 7:
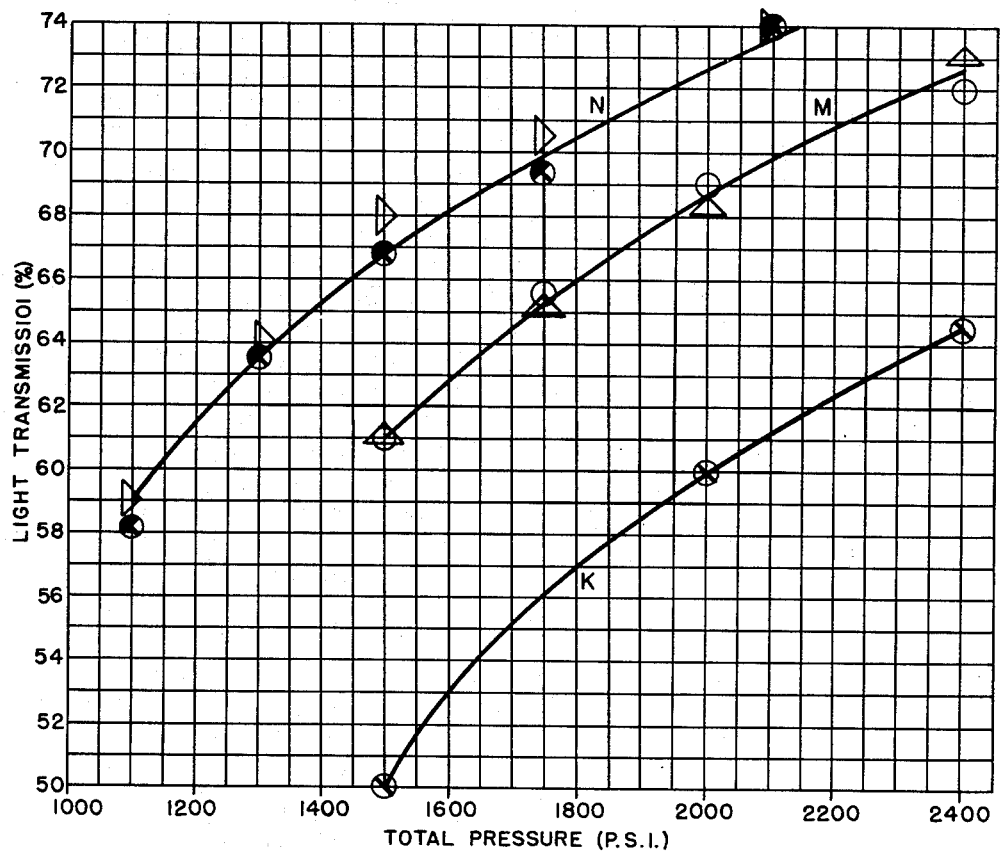
FIGURE 7 is another graph comparing performance characteristics of the method with conventional performance.

FIGURE 7 shows in the lower curve K the performance of a conventional valve without the invention being used. In a second curve M efficiency realized with the method of the invention is seen to be much higher. A third curve N of the invention method illustrates a still further increase in efficiency.

It will be observed from an inspection of these curves that there is a substantial improvement in homogenizing efficiency as measured by Light Transmission Percent at any given pressure when operating with the invention or conversely a substantial reduction in operating pressure is indicated to maintain the same degree of homogenization as measured by Light Transmission Percent when operating with the invention.

In the practical application of the invention a number of advantages are found to be realized. It will be appreciated that the range of thrust of a conventional homogenizing valve utilizing commonly known spring mechanisms is pretty much limited to a maximum value of approximately 3,000 pounds. The invention method makes it possible to extend the range of thrust up to values exceeding 10,000 pounds. Of even more importance is the fact that this thrust may be realized by finger tip control instead of the much greater turning force required to adjust conventional spring-loaded valves.

Another advantage realized is elimination or reduction of the appearance harmonic motion often occurring in homogenizer spring-loaded valve mechanisms and tending to cause detrimental oscillation of the valve. The hydraulically actuated valve of the invention is not subject to this occurrence.

It will also be observed that the hydraulic components of the invention are capable of very economical operation and are much simpler to install and maintain as compared with spring-loaded mechanisms. At the same time there is less wear tending to develop on other valve components in the machine.

The ability of the hydraulically actuated valve mechanism of the invention to operate uniformly without oscillation tends to provide for a stabilized homogenizing valve orifice which prevents passing of unhomogenized milk particles. Still another advantage is realized in eliminating expensive sanitary pressure gauge mechanisms by measuring pressure in the actuating chamber and applying correct conversion factor.

Figure 8:
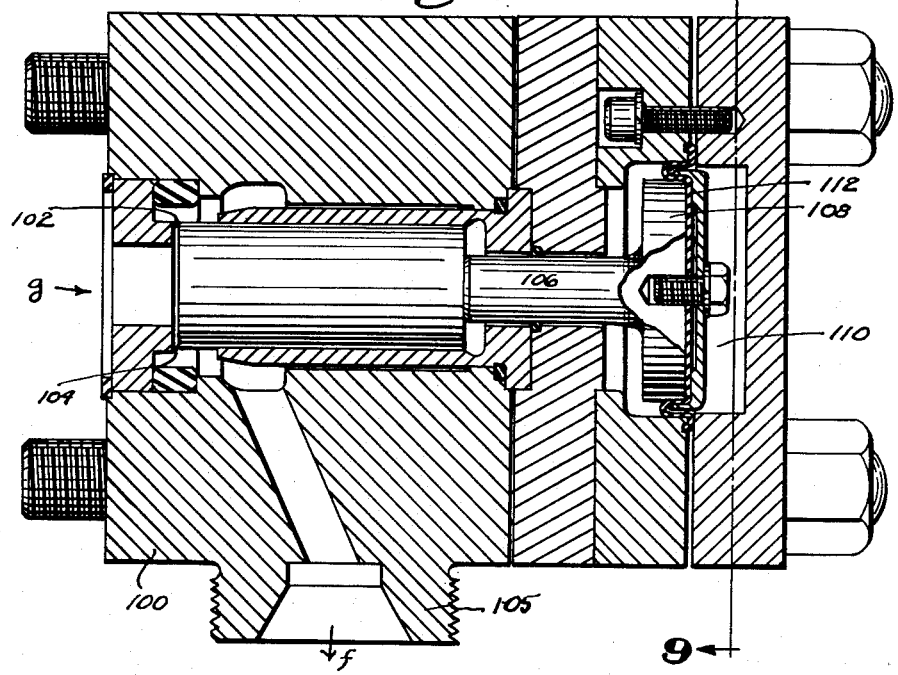
FIGURE 8 is a cross sectional view illustrating a modified form of hydraulic valve actuating mechanism.
Figure 9:
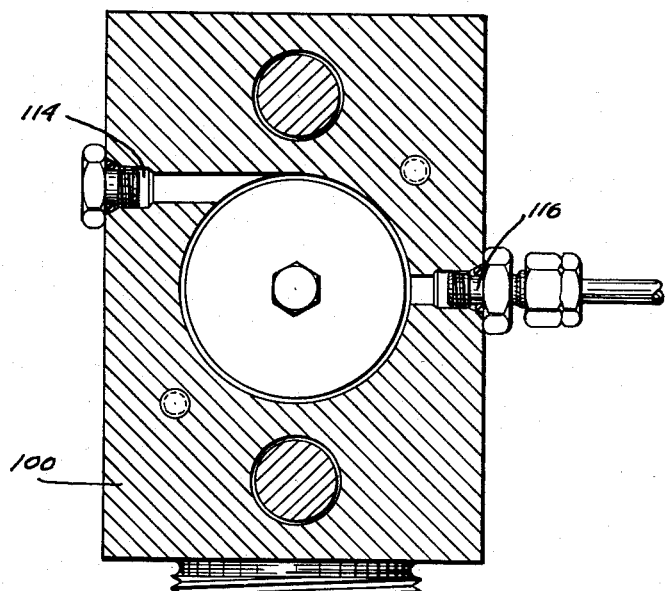
FIGURE 9 is a cross section taken on the line 9—9 of FIGURE 8.

In carrying out the method of the invention, I may desire to modify the hydraulic valve actuating mechanism in various respects, for example, as shown in FIGURES 8 and 9. In this modification a valve body 100 is provided with valve surfaces 102 and 104 and operates to process material entering at g and discharging at f from an outlet 105. The surface 104 is rigidly contained by means of a hydraulic actuator mechanism of the class described above, including a thrust rod 106 attached to a hydraulically operated member 108 in a chamber 110. The member 108 is sealably mounted by means of a flexible diaphragm arrangement 112 of the class commonly referred to as a "Bellofram" seal. Hydraulic fluid is introduced and lead through the conduits 114 and 116 as shown in FIGURE 9. I may also desire to vary this means for rigidly supporting the fixed valve surface in various other ways. It will be further understood that although I have described the invention in one preferred form for homogenizing milk, I may desire to apply the method and apparatus of the invention in processing various other liquid bodies.

From the foregoing disclosure of the invention, it will be apparent that I have devised an efficient and simple method and apparatus for processing liquid bodies with high pressure and for improving homogenization of milk particles in particular.

While I have shown and described preferred embodiments of the invention, various changes and modifications may be further resorted to within the scope of the appended claims.

I claim:

1. In a method of processing a liquid body having particles contained therein, the steps which include conducting a flow of particle containing liquid along a desired path of travel which communicates with a restricted passageway, subjecting the particle containing liquid to primary forces of acceleration within the restricted passageway to provide a high velocity mass in which component particles of the liquid are attenuated and reduced to minute droplet form, and simultaneously inducing periodic changes in the rate of flow of the particle containing liquid body and confining the resulting fluctuating flow within fixed surfaces by exerting hydraulic pressure on one of the surfaces thereby to generate secondary shock wave forces of a magnitude capable of extending disintegration of said particles while in their attenuated and minute droplet form.

2. A method according to claim 1 in which the processing step defined therein is repeated.

3. A method according to claim 1 in which the restricted passageway is of annular configuration to provide a divergent flow whereby the secondary shock wave forces are exerted in conjunction with both acceleration and deceleration forces of radial divergence.

4. A method according to claim 1 in which the step of confining the fluctuating flow of the liquid containing body consists in maintaining one of the said fixed surfaces hydraulically positioned to resist displacement.

5. A method of homogenizing which consists in pressurizing a particle containing liquid, whose flow rate varies in amplitude and frequency in a predetermined manner in accordance with a multi-plunger pumping cycle, forcing the liquid through an orifice defined by two surfaces which are held in substantially fixed relationship one to the other by exerting hydraulic pressure on one of the surfaces in a range of thrusts of from 3,000 pounds up to about 10,000 pounds, and controlling the size of the orifice in relation to the variable flow rate to generate disruptive forces derived from changes in velocity generally in accordance with the formula relationship $V=K\sqrt{2gh}$ where V represents velocity of the said liquid as computed by the formula $V=Q/A$, K is a constant, g is a gravitational constant, and h is the pressure exerted on the liquid, thereby to elongate the particles in the liquid into stretched out filaments and simultaneously separating them into a state of subdivision.

6. Method of homogenizing milk in which the fatty particles are processed to provide a reduction in size, said method consisting in producing a flow of milk along a desired conduit by means of a fluid displacement mechanism whose fluid displacement flow rate is caused to rise and fall periodically, conducting the flow of milk under relatively high pressures into an orifice defined by two parallel surfaces to provide an initial acceleration of the fatty particles to velocities of an order of magnitude of 475 feet per second whereby the particles are caused to elongate and form into separated droplets of minute size immediately upon entering said orifice, and maintain the two parallel surfaces in substantially fixed relationship to one another by exerting hydraulic pressure on one of the surfaces during change in flow rate of the accelerated particles whereby the velocities of the particles are caused to fluctuate periodically between upper and lower limits which are a function of the change in flow rate of the fluid displacement mechanism and the initially accelerated particles are subjected to sudden additional deformation and subdivision.

7. Method of processing a multi-phase liquid, said method consisting in moving the liquid by means of a pumping mechanism whose pumping flow rate varies in amplitude and frequency in a predetermined manner in accordance with a multi-plunger pumping cycle, conducting component particles of the multi-phase liquid through an orifice defined by two parallel surfaces to provide an increase in velocity of the component particles of an order of magnitude of 475 feet per second, exerting hydraulic pressure on one of the two surfaces to maintain the said surface in substantially fixed relationship to the remaining surface so that said particles at their initial point of acceleration are exposed to additional forces of acceleration, said additional forces of acceleration varying periodically between upper and lower limits which are a function of the displacement characteristics of the multi-plunger pumping cycle whereby the velocities of the component particles are caused to rise from approximately 370 feet per second to approximately 515 feet per second.

References Cited by the Examiner
UNITED STATES PATENTS

| | | | |
|---|---|---|---|
| 1,112,594 | 10/14 | Brawner | 99—60 |
| 2,053,876 | 9/36 | Pfau | 259/9 |
| 2,088,336 | 7/37 | Neitzke | 259/7 |
| 2,110,115 | 3/38 | Smith | 259—98 |
| 2,112,203 | 3/38 | Smith | 259—98 |
| 2,577,247 | 12/51 | Irwin | 99—60 |
| 2,887,129 | 5/59 | Stear | 138—43 |

CHARLES A. WILLMUTH, *Primary Examiner.*

T. E. LEVOW, A. H. WINKELSTEIN, *Examiners.*